US012634639B2

(12) United States Patent
Serman et al.

(10) Patent No.: US 12,634,639 B2

(45) Date of Patent: May 19, 2026

(54) METHOD FOR CUSTOMIZING A HEARING APPARATUS, HEARING APPARATUS AND COMPUTER PROGRAM PRODUCT

(71) Applicant: Sivantos Pte. Ltd., Singapore (SG)

(72) Inventors: Maja Serman, Erlangen (DE); Ulrich Giese, Erlangen (DE); Cecil Wilson, Erlangen (DE); Sebastian Best, Erlangen (DE); Claudia Pischel, Erlangen (DE)

(73) Assignee: Sivantod Pte. Ltd., Singapore (SG)

( * ) Notice: Subject to any disclaimer, the term of this patent is extended or adjusted under 35 U.S.C. 154(b) by 273 days.

(21) Appl. No.: 18/500,615

(22) Filed: Nov. 2, 2023

(65) Prior Publication Data

US 2024/0089669 A1 Mar. 14, 2024

Related U.S. Application Data

(63) Continuation of application No. PCT/EP2023/062802, filed on May 12, 2023.

(30) Foreign Application Priority Data

Sep. 8, 2022 (DE) ..................... 10 2022 209 384.4

(51) Int. Cl.
*H04R 25/00* (2006.01)

(52) U.S. Cl.
CPC ............. *H04R 25/30* (2013.01); *H04R 25/43* (2013.01); *H04R 25/505* (2013.01); *H04R 2225/41* (2013.01)

(58) Field of Classification Search
CPC .......... H04R 2205/041; H04R 2225/41; H04R 25/30; H04R 25/356; H04R 25/43; H04R 25/505; H04R 25/558; H04R 25/70; H04R 5/04
USPC .......................................................... 381/312
See application file for complete search history.

(56) References Cited

U.S. PATENT DOCUMENTS

| | | | |
|---|---|---|---|
| 8,844,358 | B2 | 9/2014 | Chalupper et al. |
| 2017/0164124 | A1 | 6/2017 | Shennib |
| 2021/0112350 | A1 | 4/2021 | Chau et al. |

FOREIGN PATENT DOCUMENTS

| | | | |
|---|---|---|---|
| DE | 102010010764 | A1 | 9/2011 |
| DE | 102016212881 | A1 | 6/2017 |
| EP | 2566193 | A1 | 3/2013 |
| EP | 3413585 | A1 | 12/2018 |
| JP | 2006020906 | A | 1/2006 |

*Primary Examiner* — Phylesha Dabney

(74) *Attorney, Agent, or Firm* — Laurence A. Greenberg; Werner H. Stemer; Ralph E. Locher

(57) ABSTRACT

A method for customizing a hearing apparatus includes carrying out at least one test measurement that involves audio and/or video material being played back and a hearing apparatus user assessing a sound signal being heard by the user as a test result. A hearing apparatus and a computer program product are also provided.

9 Claims, 1 Drawing Sheet

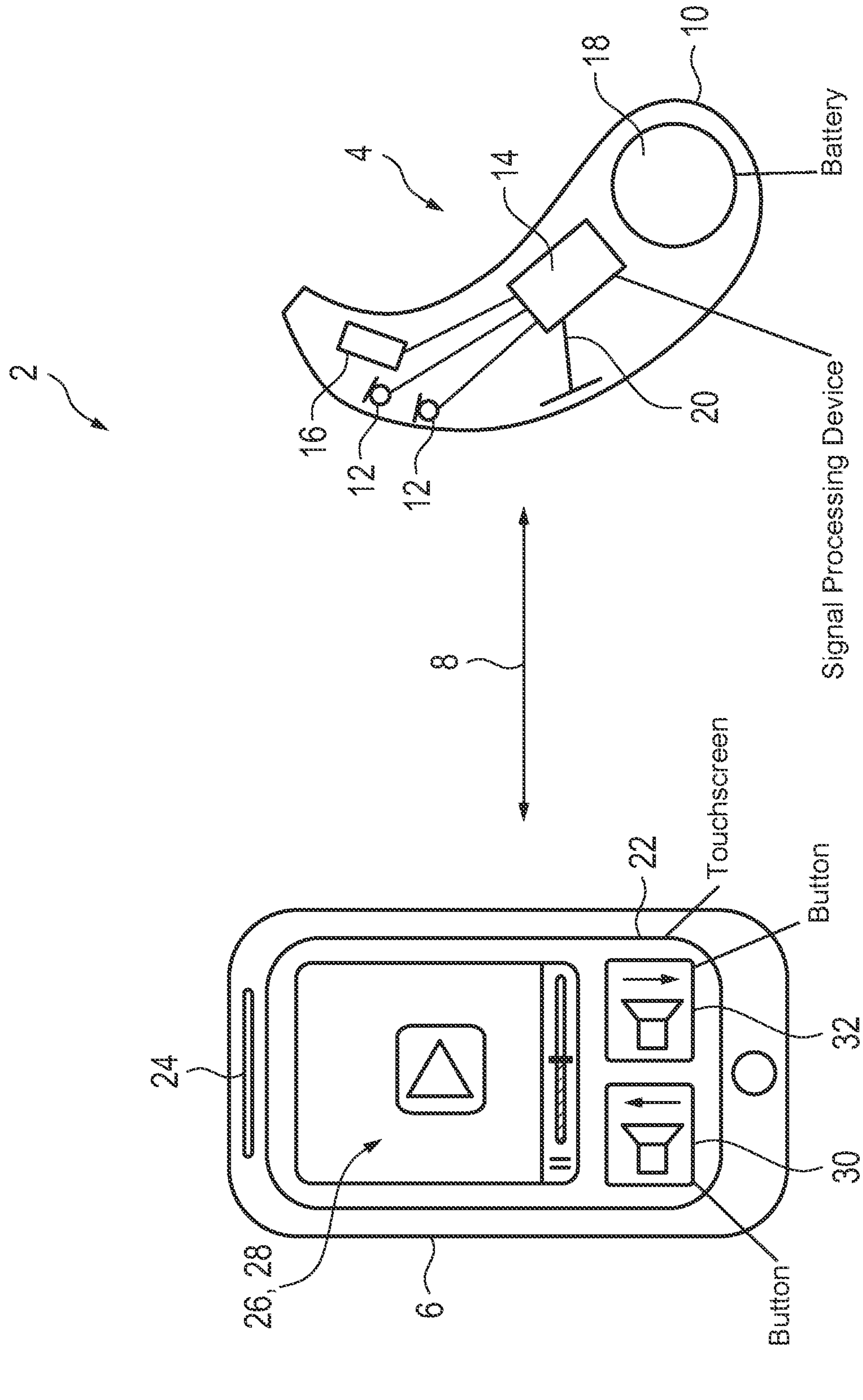
2
4
10
18
14
Battery
16
12
12
20
Signal Processing Device
8
Touchscreen
22
Button
24
32
30
26, 28
6
Button

METHOD FOR CUSTOMIZING A HEARING APPARATUS, HEARING APPARATUS AND COMPUTER PROGRAM PRODUCT

CROSS-REFERENCE TO RELATED APPLICATION

This application is a continuation, under 35 U.S.C. § 120, of copending International Patent Application PCT/EP2023/062802, filed May 12, 2023, which designated the United States; this application also claims the priority, under 35 U.S.C. § 119, of German Patent Application DE 10 2022 209 384.4, filed Sep. 8, 2022; the prior applications are herewith incorporated by reference in their entirety.

FIELD AND BACKGROUND OF THE INVENTION

The invention relates to a method for customizing a hearing apparatus, in particular a hearing device, a hearing apparatus and a computer program product or a piece of software on a data carrier.

Hearing devices are wearable hearing apparatuses (hearing aid apparatuses) used for treating the hard of hearing or the hearing-impaired. In order to meet the numerous individual needs, different structural forms of hearing apparatuses are provided, such as behind-the-ear (BTE) hearing devices and hearing devices having an external receiver (RIC: receiver in the canal) and also in-the-ear (ITE) hearing devices, for example including pinna hearing devices or canal hearing devices (CIC: completely-in-channel, IIC: invisible-in-the-channel). The hearing apparatuses listed by way of example are worn on the outer ear or in the auditory canal of a hearing apparatus user. In addition, bone conduction hearing aids, implantable hearing aids or vibrotactile hearing aids are also available on the market, however. In that case, the damaged sense of hearing is stimulated either mechanically or electrically.

In principle, such hearing apparatuses or hearing devices have an input transducer, an amplifier and an output transducer as basic components. The input transducer is generally an acoustoelectric transducer, such as for example a microphone, and/or an electromagnetic receiver, for example an induction coil or a (radio-frequency, RF) antenna. The output transducer is usually implemented as an electroacoustic transducer, for example as a miniature loudspeaker (receiver), or as an electromechanical transducer, for example a bone conduction receiver. The amplifier is normally integrated in a signal processing device. Power is normally supplied by a battery or a chargeable accumulator.

The input signals picked up by the input transducers are typically multichannel; that means that the input signals are divided into multiple individual frequency channels, each frequency channel covering a frequency band of a certain spectral width. For example, in that case, a hearing device can have 48 (frequency) channels in a frequency range between 0 kHz (kilohertz) and 24 kHz, the individual signal components of the input signal in the channels being individually processable, in particular individually filterable and/or amplifiable, by using the signal processing device.

Optimum customization to the needs of a hearing apparatus user can be achieved by skilled setting of the time-dependent and frequency-dependent amplification of an audible input signal by a hearing apparatus. That results in the problem of determining as optimum as possible a time-dependent and frequency-dependent gain for the hearing apparatus user or hearing device user/wearer.

The aim of the (initial) customization of a hearing device is in particular to find the best gain/sound and algorithm settings for all individual hearing device wearers. The most important input is the audiometric data of the hearing device wearer (bone/air conduction threshold, degree of discomfort). In addition, some customization methods also take account of other information relating to the hearing device wearer, such as age, sex and experience with hearing devices, in order to optimize the initial customization further. An approximately normal audiogram does not mean, however, that the hearing device wearer will also have normal hearing capacity in real hearing situations, in particular if the hearing situations become more complex (e.g. speaking over noise).

Initial customization strategies today generally use audiometric input data in order to compute the required aims for the hearing device customization. Hearing capacity in real life is generally not taken into account, however. In addition, it is generally necessary for an audiologist to perform the initial customization and to additionally make one or more fine adjustments in order to produce further individual optimizations, e.g. in regard to gain/compression, but also in regard to directivity and noise rejection. That is comparatively complex and requires good technical and also communicative capabilities.

People with slight to moderate hearing loss often use over-the-counter (OTC) or prescription-free hearing devices for cost reasons. In that case, the hearing device wearer themself is responsible for setting up the hearing device, including customizing and adjusting the tone. The hearing device wearer therefore generally needs to accomplish initial customization without audiometric input data and without professional assistance.

SUMMARY OF THE INVENTION

It is accordingly an object of the invention to provide a particularly suitable method for customizing a hearing apparatus, a hearing apparatus and a computer program product on a data carrier, which overcome the hereinafore-mentioned disadvantages of the heretofore-known methods, apparatuses and products of this general type. In particular, the aim is to specify a self-customization method for an OTC hearing device that is as simple to carry out as possible.

With the foregoing and other objects in view there is provided, in accordance with the invention, a method for customizing a hearing apparatus, the method comprising:

- providing a hearing apparatus including at least one input transducer for picking up an audible signal and converting it into an input signal, a signal processing device for signal processing the input signal and generating an output signal, and an output transducer for converting the output signal into a sound signal,
- at least one test measurement is carried out that involves a media content containing acoustic information being played back and that involves the hearing apparatus user assessing a sound signal they have heard from the output transducer as a test result, and
- the signal processing of the signal processing device is adjusted or customized according to the test result.

Where method steps are described below, advantageous embodiments will arise for the hearing apparatus and/or the software in particular as a result of the hearing apparatus and/or software being configured to perform one or more of these method steps.

The method according to the invention is intended and also suitable and configured for customizing a hearing apparatus, in particular a wearable hearing apparatus. The hearing apparatus is also referred to as a hearing device system or hearing system below.

With the objects of the invention in view, there is also provided a hearing apparatus, comprising:

at least one input transducer for picking up an audible signal and converting it into an input signal, a signal processing device for signal processing the input signal and generating an output signal, an output transducer for converting the output signal into a sound signal, a media reproduction unit for reproducing a media content containing acoustic information, and a controller for carrying out the method according to the invention.

The hearing apparatus is used in particular for treating a hearing-impaired user (hearing apparatus user). In this case, the hearing apparatus is configured to pick up sound signals from the surroundings and to output them to the hearing apparatus user. To this end, the hearing apparatus includes at least one input transducer, in particular an acousto-electric transducer, such as for example a microphone.

During operation of the hearing apparatus, the input transducer picks up sound signals (noise, sounds, speech, etc.) from the surroundings and converts each of them into an electrical input signal. The input signal in this case is in particular of multichannel configuration. In other words, the audible signals are converted into a multichannel input signal. The input signal thus has multiple frequency channels, in particular at least two, preferably at least 20, particularly preferably at least 40, for example 48 (frequency) channels, which each cover an associated frequency band of a frequency range of the hearing apparatus. By way of example, a frequency range between 0 kHz and 24 kHz is divided into 48 channels in this case, and so input signals having 48 channels are generated.

The hearing apparatus furthermore includes an output transducer, in particular an electroacoustic transducer, such as for example a receiver or miniature loudspeaker. An electrical (multichannel) output signal is generated from the electrical (multichannel) input signal by processing and modifying (e.g. amplifying, filtering, attenuating) the input signal, or the individual frequency or signal channels, in a signal processing device. According to the invention, the signal processing device is adjusted, in particular in respect of signal gain, in the course of the customization on the basis of a test result of a test measurement.

According to the method, a hearing apparatus is customized by carrying out at least one test measurement that involves a media content, that is to say audio and/or video material, being played back. In this case, the hearing apparatus user assesses a sound signal they have heard from the output transducer as a test result. The hearing apparatus is preferably adjusted or customized on the basis of the test result in this case. This produces a particularly suitable method for customizing the hearing apparatus. In particular, the customization is therefore easily performable by the hearing apparatus users themselves.

The conjunction "and/or" is intended to be understood here and below as meaning that the features linked by this conjunction can be implemented either jointly or as alternatives to one another.

By way of example, the hearing apparatus includes a media reproduction unit for reproducing the media content. In this case, a media content is understood to mean an information content that includes audible signals (speech dialog, music, noise, sounds, and so on) and optionally also visually displayable signals (images, video, and so on). The media reproduction unit is preferably coupled to a screen and an audio output, and so the optional visual signals are displayable by using the screen, for example, and the audible signals are able to be output to the input transducer via the audio output.

Audio material is intended to be understood to mean an audio clip, for example, that is to say a clip or excerpt from an audible signal (speech dialog, noise, sounds, music, and so on). Video material is intended to be understood to mean a video, a video clip or film, for example, that is to say moving visual images with an audible accompanying tone (audible accompanying signal).

Acoustic information is intended to be understood here and below to mean in particular parameters or characteristic quantities of the audible signal that are relevant to customization, such as for example volume, target sounds, frequency shaping, signal-to-noise ratio (SNR), directivity or the like. This acoustic information may in this case be defined for all frequency channels or specifically, that is to say for a selection of frequency channels or individual frequency channels.

The audio and/or video material or the media content is known or stored. In other words, in particular the acoustic information of the media content is precharacterized or known. The reaction of the hearing apparatus user to the known acoustic information therefore allows conclusions to be drawn about their hearing loss or hearing damage, thereby facilitating simple and reliable customization.

The present invention relates in particular to a method for automatically customizing hearing devices to the individual needs of the user while or after an audio/video clip or film is being or has been listened to or viewed. In one illustrative version, the method requires no audiometric data from the person with impaired hearing and also no other information in advance. The main input for the method is the reaction of the listener (hearing apparatus user) to the sound or the audible signal/the acoustic information of the audio/video clip that is played back.

In one advantageous embodiment, the acoustic information of the media content is altered during the test measurement. This results in portions of the media content being reproduced differently. Alternatively, it is for example likewise possible to carry out multiple gradual or successive test measurements using different or altered acoustic information.

In one conceivable embodiment, the hearing apparatus user is asked, for example, to react whenever it is difficult for them to hear a sound or to follow the film. Playing back excerpts containing different scene characteristics or different acoustic information (different target sounds, different volume, different frequency shaping, different SNR, and so on) and analyzing the hearing reactions according to these characteristics (test result) allows the method to determine the degree of hardness of hearing, hearing profiles and preferences and also the required hearing device customization or customization profiles.

This is accompanied by various advantages. First, the listener can carry out this customization method themself, even without an audiologist, which is advantageous in particular in the case of OTC hearing devices. Second, the hearing profile is ascertained using real signals, which are more relevant to actual hearing than audiometric test tones. Third, the method is able to determine much more than just hearing thresholds, and so there is much more input for individualizing the customization, e.g. in regard to noise reduction or directivity. And finally, it is more fun to watch a film than to carry out an audiometric test, which means that the attention of the hearing apparatus user during the test measurement is higher, and so more reliable customization is possible.

In one suitable development, the acoustic information or settings of the media content, that is to say the played-back audio and/or video material, is altered on the basis of the test results. This feedback allows multiple settings or parameters to be determined or recorded for the customization while the audio and/or video material is played back. This allows the customization method to be carried out in a particularly time-efficient manner.

In one suitable development, the responses of the hearing apparatus user (test results) influence/alter the sound of the video clip, for example, in such a way that, at the end of the video clip, the method approximates the best hearing device configuration (customization and function settings) for the individual listener.

An additional or further aspect of the invention provides for the acoustic information of the media content to be able to be continuously altered by the hearing apparatus user, a continuous test result being recorded. In one advantageous embodiment, the acoustic information includes a foreground signal and a background signal, only the foreground signal being altered in the course of an alteration of the acoustic information.

The acoustic information therefore includes a variable or adjustable signal component (for example volume of a speech dialog) and an unalterable signal component (for example background noise). The various signal components can be output by different loudspeakers, for example. By way of example, the hearing apparatus user can therefore use a specific volume control for the main/target loudspeaker (while the background scene remains unaffected), e.g. can raise the volume if they have problems with comprehension and can lower the volume if it is too loud. The analysis of the continuous responses (test results) for different scene features allows the method to derive an individual target SNR.

In one possible manifestation, the method can use continuously measured sensor data or combinations thereof (measured by the hearing device or by an external adjusting unit) to assess hearing problems or listening effort.

In one conceivable embodiment, the hearing apparatus user is offered a number of selection options, that is to say multiple or at least two selection options, for altering the acoustic information of the media content, between which options the hearing apparatus user can switch. The selection options differ in terms of the alteration produced for the acoustic information, wherein the selection options or the alterations produced thereby for the acoustic information are adjusted or altered on the basis of the test result.

In one possible embodiment, a preference of the hearing apparatus user is determined by their selection of continuously offered hearing options, e.g. two hearing options A, B using the user controller on a hearing device or on an external adjusting unit of the hearing apparatus. The hearing options A/B can differ in terms of total gain, level-dependent gain/compression, frequency shaping, maximum output power, directionality, noise rejection settings, feedback rejection settings or other functions/system settings, the (selection) options being able to develop further during the running time of the media content in accordance with the options already selected.

The hearing apparatus according to the invention includes at least one input transducer for picking up an audible signal and converting it into an input signal, a signal processing device for signal processing the input signal and generating an output signal, an output transducer for converting the output signal into a sound signal, a media reproduction unit for reproducing a media content containing acoustic information, and a controller.

The controller in this case is configured generally—by programming and/or circuitry—to carry out the method according to the invention described hereinabove. The controller is therefore specifically configured so as, in the course of a test measurement, to play back a media content via the media reproduction unit, to record a test result from the hearing apparatus user, and to take the test result as a basis for adjusting the signal processing of the signal processing device.

In one preferred configuration, the controller is formed at least in essence by a microcontroller having a processor and a data memory, in which the functionality for carrying out the method according to the invention is implemented by programming in the form of operating software (firmware), with the result that the method is automatically carried out—possibly in interaction with an apparatus user—when the operating software is executed in the microcontroller. Within the context of the invention, the controller may, however, alternatively also be formed by a non-programmable electronic assembly, such as for example an application-specific integrated circuit (ASIC), or by an FPGA (field programmable gate array), in which the functionality for carrying out the method according to the invention is implemented using circuitry.

By way of example, the hearing apparatus according to the invention includes a hearing device, in particular an OTC hearing device. The hearing apparatus preferably includes a hearing system having an (OTC) hearing device and an adjusting unit, coupled thereto for signal transfer purposes, for altering the acoustic information of the media content.

The adjusting unit is preferably a separate mobile operating and display unit, for example a mobile phone, in particular a mobile phone having a computer function, or a smartphone, or a tablet computer. The adjusting unit in this case preferably includes the media reproduction unit for reproducing the media content.

By way of example, the adjusting unit in this case includes a stored application software (operating software) through the use of which the audio and/or video material is played back, and through the use of which the test results of the hearing apparatus user are recorded. The test results are then used by the application software to adjust the settings or gain of the hearing device. To this end, the application software is preferably installable or installed on the operating and display unit as a so-called app or mobile app (mobile application, smartphone app).

This development is based on the observation that modern operating and display units, such as in particular smartphones or tablet computers, are widely used in today's society and are generally available and accessible to a user at any time. In particular, the user of the hearing aid apparatus is highly likely to have basically one such operating and display unit in their household.

The surfaces of smartphones or tablet computers, which are typically in the form of touchscreens (display unit, display), furthermore permit particularly simple and intuitive use of the application software of the operating and display unit formed thereby. This means that a smartphone or tablet computer can be upgraded particularly cheaply to monitor the hearing aid apparatus.

The operating and display unit includes an internal controller formed at least in essence by a microcontroller having a processor and a data memory, in which the functionality for carrying out the method is implemented by programming in the form of the application software, with the result that the method, or the determination of the operating state of the hearing devices, is automatically carried out—possibly in interaction with the user—when the application software is executed in the microcontroller.

With the objects of the invention in view, there is concomitantly provided a computer program product or a piece of software on a medium or data carrier for performing or carrying out the method according to the invention when the software runs on a computer.

This means that the software is stored on a data carrier, and is intended and also suitable and configured for performing the method described hereinabove. This produces a particularly suitable software for customizing a hearing apparatus that implements the functionality for carrying out the method according to the invention by programming. The software is therefore in particular an operating software (firmware), the data carrier being a data memory of the controller, for example.

The advantages and embodiments cited in respect of the method also apply, mutatis mutandis, to the hearing apparatus and/or the software, and vice versa.

Other features which are considered as characteristic for the invention are set forth in the appended claims.

Although the invention is illustrated and described herein as embodied in a method for customizing a hearing apparatus, a hearing apparatus and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is a simplified and diagrammatic representation of a basic configuration of an exemplary embodiment of a hearing apparatus according to the invention.

DETAILED DESCRIPTION OF THE INVENTION

Referring now in detail to the single FIGURE of the drawing, there is seen a hearing apparatus 2 which is in particular embodied as a hearing aid apparatus in the form of a hearing system having a hearing device 4 and having an external adjusting unit 6. By way of illustration, the hearing device 4 in this case is embodied as a behind-the-ear (BTE) hearing aid. The hearing device 4 is in particular an OTC hearing device. The hearing device 4 and the adjusting unit 6 are coupled to one another by a wireless communication connection 8 for signal transfer purposes. The communication connection 8 is preferably embodied as a radio connection, for example as a Bluetooth or RFID connection.

As shown diagrammatically in the FIGURE, the hearing device 4 includes a device housing 10 in which one or more microphones 12, also referred to as acoustoelectric transducers (input transducers), are installed. The microphones

12 are used to pick up the sound or the audible signals in the surroundings and to convert it/them into an electrical audio signal.

The audio signal is processed by a signal processing device 14, which is likewise disposed in the device housing 10. The signal processing device 14 takes the audio signal as a basis for generating an output signal, which is routed to a loudspeaker or receiver 16. The receiver 16 in this case is embodied as an electroacoustic transducer (output transducer) that converts the electrical output signal into an audible signal and outputs it. In the case of the BTE hearing device 4, the audible signal may be transmitted to the eardrum of a hearing aid apparatus user via a sound tube or external receiver (not shown in more detail), which is connected to an earmold that is captive in the auditory canal. However, an electromechanical transducer is also conceivable as the receiver 16, for example, as in the case of a bone conduction receiver, for example.

Power is supplied to the hearing device 4 and in particular the signal processing device 14 by a battery 18 accommodated in the device housing 10.

The signal processing device 14 is also routed to a transceiver 20 of the hearing device 4 for signal transfer purposes. The transceiver 20 is used to send and receive wireless signals by using the communication connection 8. The transceiver 20 in this case may be embodied as an induction coil, for example.

In the exemplary embodiment shown in the FIGURE, a separate, mobile, operating and display unit acting as the adjusting unit 6 is coupled to the hearing device 4 by the communication connection 8 for signal transfer purposes. The diagrammatically shown adjusting unit 6 is in particular a smartphone. The smartphone 6 includes a touch-sensitive display unit (display) 22, also referred to as a touchscreen below. The smartphone 6 also has at least one loudspeaker 24 for emitting audible signals.

The coupling between the smartphone 6 and the transceiver 20 of the hearing device 4 for signal transfer purposes is produced in this case by way of an appropriate integrated transceiver, for example of a radio antenna, of the smartphone 6, which is not denoted more specifically.

The smartphone 6 includes an integrated controller, which is basically formed by a microcontroller having implemented application software 26. The application software 26 is preferably a mobile app, or a smartphone app, stored in a data memory of the controller. During operation, the controller displays the application software 26 on the touchscreen 22, the application software 26 being able to be controlled by a hearing apparatus user by using the touch-sensitive surface of the touchscreen 22.

A method according to the invention for customizing the hearing aid apparatus 2 to the hearing needs of the hearing apparatus user is explained below.

During the execution of the application software 26, a media content 28, in particular audio and/or video material, is played back by using a media reproduction unit, not denoted more specifically, of the smartphone 6. This involves a corresponding sound signal being generated by the loudspeaker 24. The hearing apparatus user assesses the sound signal they have heard as a test result. As the test result, the hearing apparatus user pushes a button 30, for example, on the touch display 22 in order to increase the volume of the media content 28, or a button 32 in order to reduce the volume of the media content 28.

The hearing apparatus 2 or the hearing device 4 is preferably adjusted or customized on the basis of the test result in this case. To this end, the application software 26 evaluates the test results, for example, and generates a customization signal, which is transferred to the signal processing device 14 via the communication connection 8. The signal processing device 14 is consequently customized or adjusted on the basis of the customization signal.

The method therefore facilitates automatic customization of the hearing device 4 to the individual needs of the hearing apparatus user while or after the media content 28 is being or has been listened to or viewed.

Subsequently to the method, it is possible for example to use the application software 26 for simple audiovisual exercises. By way of example, a media content can be played back that shows a head of a speaker who clearly and distinctly pronounces target phonemes, for example in order to practice lip reading. As a result, subsequently to the method, the user is better able to accustom themself to the new hearing device settings, for example.

The claimed invention is not restricted to the exemplary embodiments described hereinabove. Rather, other variants of the invention can also be deduced therefrom by a person skilled in the art within the scope of the disclosed claims without departing from the subject matter of the claimed invention. In particular, furthermore, all of the individual features described in connection with the various exemplary embodiments can also be combined with one another in some other way within the scope of the disclosed claims without departing from the subject matter of the claimed invention.

The following is a summary list of reference numerals and the corresponding structure used in the above description of the invention.

LIST OF REFERENCE SIGNS

- 2 hearing apparatus
- 4 hearing device
- 6 adjusting unit/smartphone
- 8 communication connection
- 10 device housing
- 12 microphone, input transducer
- 14 signal processing device
- 16 receiver, output transducer
- 18 battery
- 20 transceiver
- 22 display/touchscreen
- 24 loudspeaker
- 26 application software
- 28 media content
- 30 button
- 32 button

The invention claimed is:

1. A method for customizing a hearing apparatus, the method comprising:

providing a hearing apparatus including at least one input transducer for picking up an audible signal and converting the audible signal into an input signal, a signal processing device for signal processing of the input signal and for generating an output signal, and an output transducer for converting the output signal into a sound signal;

carrying out at least one test measurement by playing back a media content being a video material containing acoustic information and having a hearing apparatus user assess a sound signal heard by the hearing apparatus user from the output transducer as a test result;

continuously altering the acoustic information by the hearing apparatus user and recording a continuous test result; and adjusting or customizing the signal processing of the signal processing device in dependence on the test result.

2. The method according to claim 1, which further comprises altering the acoustic information of the media content during the test measurement.

3. The method according to claim 2, which further comprises offering a plurality of selection options to the hearing apparatus user for altering the acoustic information, permitting the hearing apparatus user to switch between the options, the selection options differing in terms of an alteration produced for the acoustic information, and adjusting or altering the selection options or the alterations produced by the selection options for the acoustic information based on the test result.

4. The method according to claim 1, which further comprises altering the acoustic information of the media content based on the test results.

5. A non-transitory computer program product including program code stored on a non-transitory data carrier for carrying out the method according to claim 1 when executed on a computer.

6. A method for customizing a hearing apparatus, the method comprising:

providing a hearing apparatus including at least one input transducer for picking up an audible signal and converting the audible signal into an input signal, a signal processing device for signal processing of the input signal and for generating an output signal, and an output transducer for converting the output signal into a sound signal;

carrying out at least one test measurement by playing back a media content containing acoustic information and having a hearing apparatus user assess a sound signal heard by the hearing apparatus user from the output transducer as a test result;

providing the acoustic information with a foreground signal and a background signal, and only altering the foreground signal in a course of an alteration of the acoustic information; and adjusting or customizing the signal processing of the signal processing device in dependence on the test result.

7. A hearing apparatus, comprising:

at least one input transducer for picking up an audible signal and converting the audible signal into an input signal;

a signal processing device for signal processing of the input signal and generating an output signal;

an output transducer for converting the output signal into a sound signal;

a media reproduction unit for reproducing a media content containing acoustic information; and a controller for carrying out the method according to claim 1.

8. The hearing apparatus according to claim 7, which further comprises an adjusting unit for altering the acoustic information of the media content.

9. The hearing apparatus according to claim 8, wherein said adjusting unit is a mobile operating and display unit.

* * * * *